United States Patent [19]
Murphy

[11] 3,970,439
[45] July 20, 1976

[54] PARTICLE SEPARATOR

[75] Inventor: Joseph P. Murphy, Newtown, Conn.

[73] Assignee: Avco Corporation, Stratford, Conn.

[22] Filed: Apr. 11, 1975

[21] Appl. No.: 567,243

Related U.S. Application Data

[63] Continuation-in-part of Ser. No. 406,740, Oct. 15, 1973, abandoned.

[52] U.S. Cl. .................................. 55/306; 55/276; 55/385 B; 55/426; 55/440; 55/443; 55/DIG. 14; 55/DIG. 21; 60/39.09 P; 244/53 B

[51] Int. Cl.² ........................................ B01D 45/04

[58] Field of Search ............. 55/276, 306, 385, 397, 55/423, 424, 440, 442, 443–446, DIG. 14, DIG. 21, 426; 60/39.09 P; 181/49, 56, 63; 244/53 B

[56] References Cited
UNITED STATES PATENTS

| | | | |
|---|---|---|---|
| 1,693,479 | 11/1928 | Edgar | 55/440 X |
| 1,803,540 | 5/1931 | Taylor | 55/440 X |
| 1,820,795 | 8/1931 | Gordon et al. | 55/440 X |
| 3,224,175 | 12/1965 | Beach | 55/440 |
| 3,254,475 | 6/1966 | Farr et al. | 55/440 |
| 3,673,771 | 7/1972 | Dickey | 55/306 |
| 3,720,045 | 3/1973 | Murphy | 55/306 |
| 3,748,832 | 7/1973 | Furlong | 55/440 |
| 3,778,983 | 12/1973 | Rygg | 55/306 |

FOREIGN PATENTS OR APPLICATIONS

| | | | |
|---|---|---|---|
| 543,466 | 1/1932 | Germany | 55/397 |
| 769,259 | 10/1934 | France | 55/443 |
| 446,268 | 4/1936 | United Kingdom | 55/442 |

*Primary Examiner*—Frank W. Lutter
*Assistant Examiner*—David L. Lacey
*Attorney, Agent, or Firm*—Charles M. Hogan; Irwin P. Garfinkle

[57] ABSTRACT

A particle separator for separating and removing foreign particles from engine inlet air incorporates a plurality of identical channel assemblies. The channel assemblies are arranged in side-by-side fashion in a defined panel area. Separation is achieved by accelerating the particles to a high velocity and bending the airstream such that the particle inertia carries the particles into a capture area. A small percentage of the incoming air is used to induce particulate matter to proceed into the capture area. By use of a turbulence generator particulates are kept in suspension in the capture area to enable easy exhaustion overboard.

3 Claims, 4 Drawing Figures

PARTICLE SEPARATOR

This application is a continuation-in-part of application Ser. No. 406,740, filed Oct. 15, 1973, now abandoned.

BACKGROUND OF THE INVENTION

This invention relates generally to particle separators and more particularly to a particle separator for removing contaminants such as sand and dust from the airstream supplied to an engine. Operation in particle-laden or dirty air reduces both the overall efficiency and life expectancy of reciprocating engines. In gas turbine engines of the type used to power helicopters and the like, operation in sand-laden atmospheric conditions has resulted in a dramatic increase in cases of engine erosion damage and has underscored the need for effective systems to protect such engines from the air-carried particles. This problem becomes more acute in the small-size class engine where the relatively delicate nature of flow path components and the high angular velocities employed substantially reduce the engine tolerance to sand particle ingestion. Over the years, numerous sand and dust separators have been developed. Examples of such separators are shown in U.S. Pat. Nos. 3,371,471 and 3,534,548, both issued to H. D. Connors; 3,673,771, Dickey; and 3,720,045, Murphy; all assigned to Avco Corporation, assignee of the present invention. Other examples of separators are covered in French Pat. No. 769,259, British Pat. No. 446,268, U.S. Pat. No. 1,803,540 and German Pat. No. 543,466.

The increased engine protection afforded by these units has more than justified their use. However, physical limitations imposed by engine configurations limit the use of such units. With regard to gas turbine engines, the particle separator herein described is both small and efficient in that it removes contaminants without a large pressure drop across the assembly.

Accordingly, it is an object of this invention to provide a particle separator which can be added to any existing engine.

A further object of this invention is to provide a particle separator which can be used with automobile and truck engines, as well as gas turbine engines.

A still further object of this invention is to provide a particle separator which incorporates a plurality of channel assemblies arranged side-by-side.

And yet another object of this invention is to provide a particle separator having a substantially flat panel configuration wherein the size of said panel can be changed depending on the requirements of the engine with which the separator is to be incorporated.

SUMMARY OF THE INVENTION

This invention provides an improved particle separator for removing foreign particles from the stream of air supplied to an engine. The separator comprises a plurality of identical tortuous passage channel assemblies arranged side-by-side in a substantially flat panel configuration. Separation is achieved by accelerating the particles to a high velocity and bending the airstream such that the particle inertia carries the particles into the capture area. The entrapped particles are retained in the capture area in a state of suspension for later disposal through a common scavenge manifold from whence they may be ejected overboard.

Other objects, details, uses and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention in which.

DESCRIPTION OF ILLUSTRATED EMBODIMENT

Figure 1:
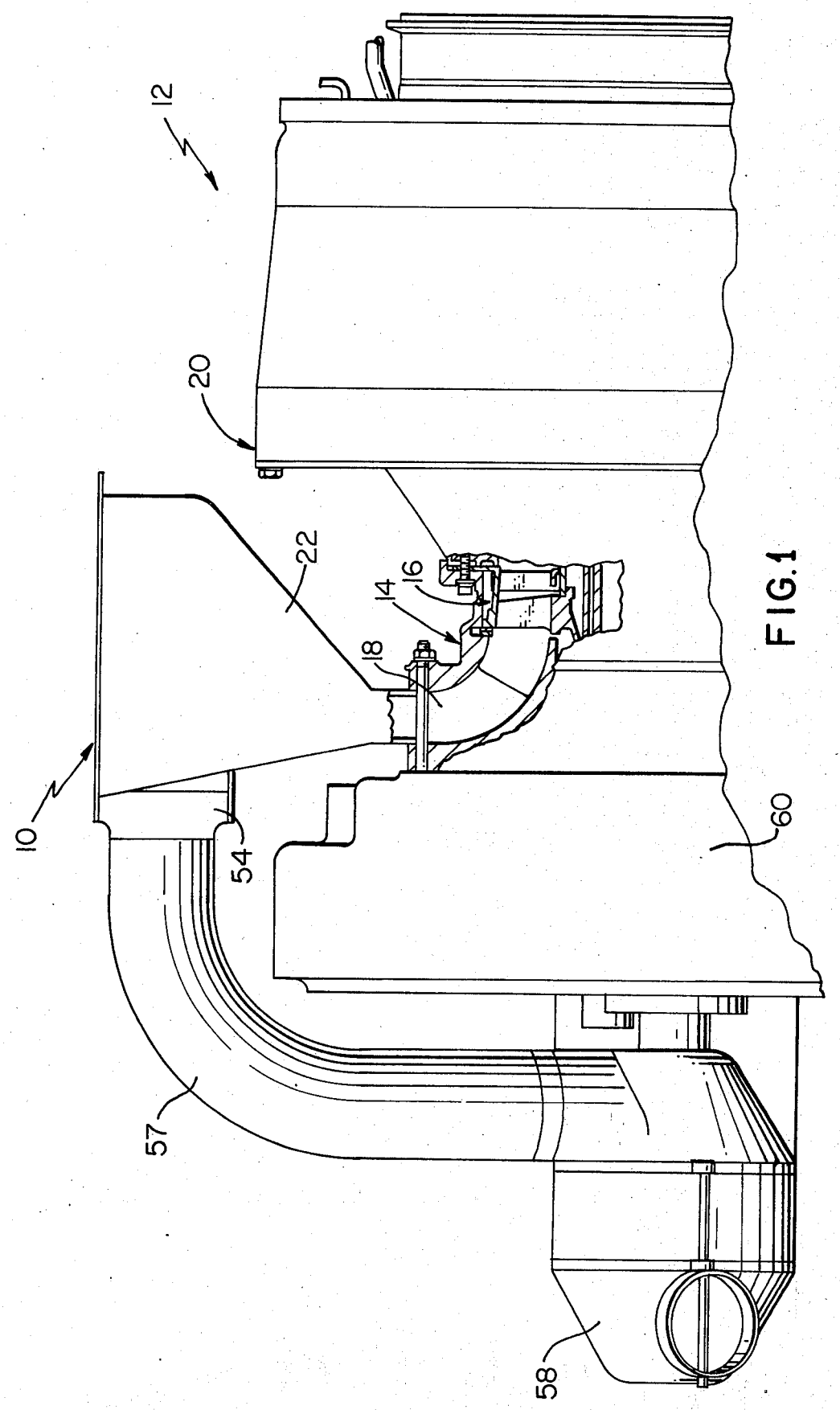
FIG. 1 is a fragmentary side view, partially broken away, of an exemplary gas turbine engine upon which the particle separator of this invention is mounted.

Reference is now made to FIG. 1 which illustrates one exemplary embodiment of the improved particle separator of this invention which is designated generally by the reference numeral 10. The separator 10 in this embodiment is seen to be used in association with a gas turbine engine designated generally as 12. It will be apparent from the specific description of the separator 10 that such separator may be used with any type engine which requires a supply of clean air for its operation.

The separator 10 is secured by suitable means adjacent the gas generator module 14. The module 14 includes a compressor stage 16 cooperating with the inlet flow path, generally shown as 18. The flow path 18 leaves the compressor stage 16 to enter the combustor/power module 20 in a known manner. Suitable means, such as a scroll 22, connect the separator 10 with the generator module 14 and provide a flow path between the separator 10 and the flow path 18.

Figure 2:
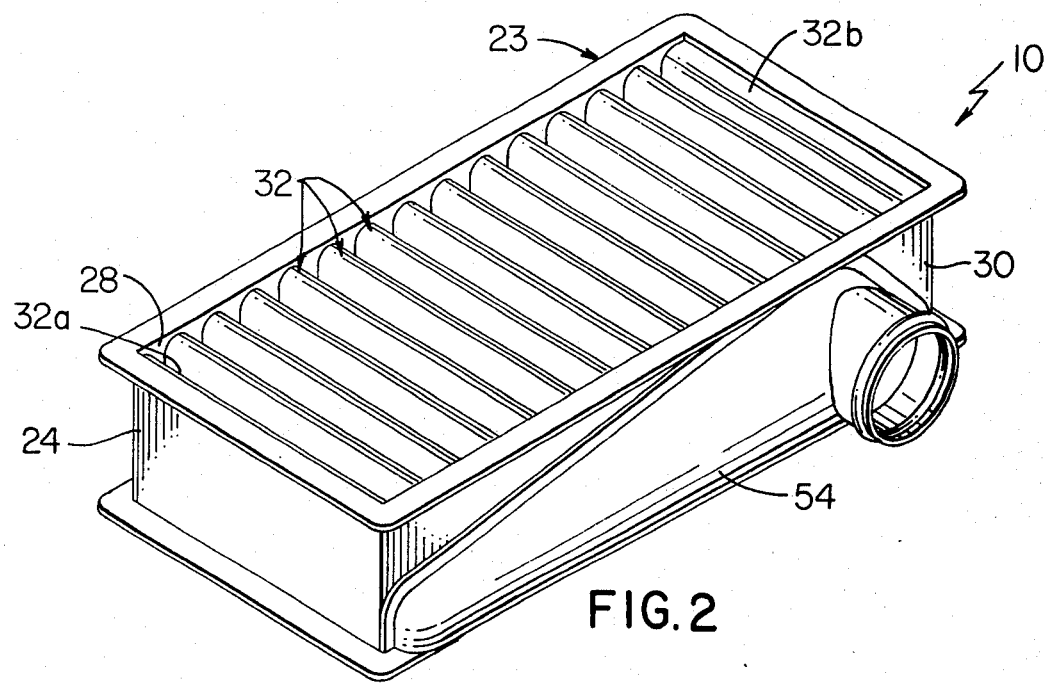
FIG. 2 is a perspective view of the particle separator of this invention.
Figure 3:
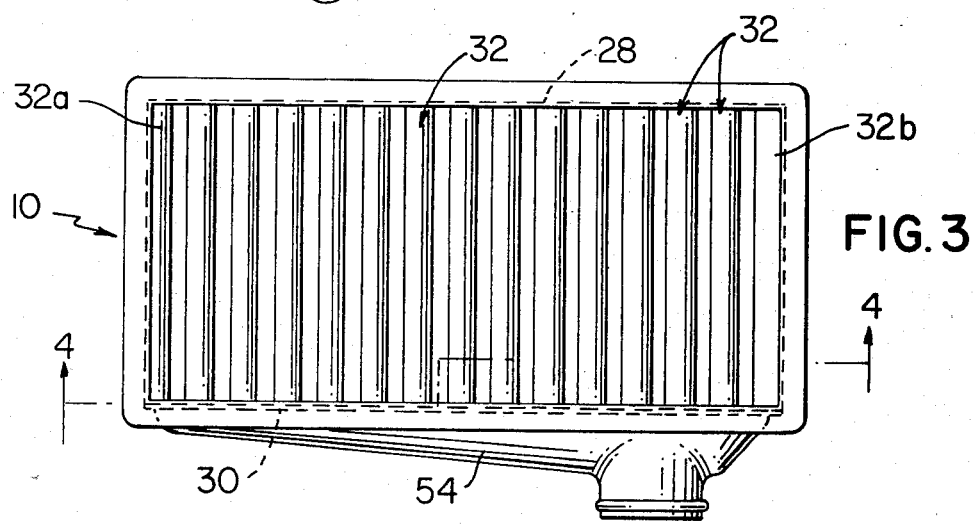
FIG. 3 is a top view of the separator of FIG. 2.
Figure 4:
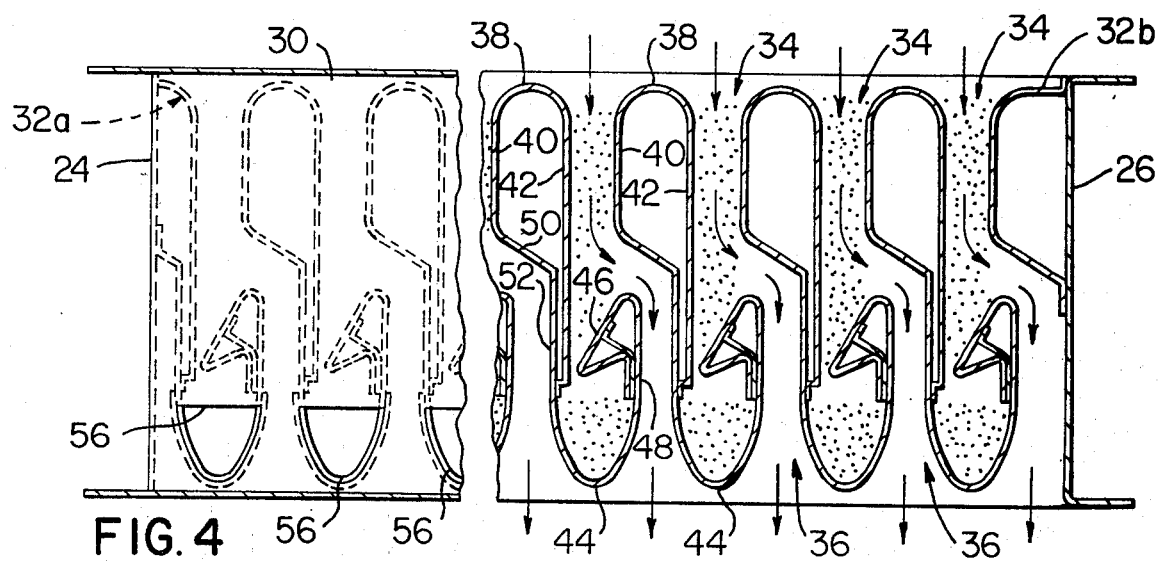
FIG. 4 is an enlarged view taken along the line 4—4 of FIG. 3.

Referring now to FIGS. 2–4, the separator 10 is seen to be of a substantially flat panel configuration formed by a housing 23. The housing 23 is defined by end walls 24 and 26 and side walls 28 and 30.

Mounted within the housing 23 and between the side walls 28 and 30 is a plurality of identical channel assemblies designated generally as 32. Referring particularly to FIG. 4, it is seen that the assemblies 32 each define a plurality of air inlet passages therebetween, designated generally as 34, and a plurality of air outlet passages defined generally as 36. It may be seen that the inlet passage 34 is displaced or offset from the outlet passage 36 such that the air passing therethrough is turned or bent by two successive angles, neither of which exceeds 90 degrees.

The assemblies 32 may be formed of any suitable material, such as sheet metal, plastic or the like. The assemblies comprise generally a curved forward wall portion 38, having at one end a generally planar intermediate wall 42 and at its other end an interior extending wall 40, a reversely curved rear wall portion 44, said reversely curved rear portion being at its one end 52 effectively connected both to said intermediate wall 42 and to a transverse wall 50 connecting interior extending wall end 40 with reversely curved wall end 52, thereby providing a transverse displacement between the curved forward wall portion 38 and the reversely curved rear wall. The assemblies 32 may be formed as an integral member, as shown herein. The various portions and walls may be formed independently and connected one to the other. Partial assemblies 32a and 32b are mounted at the extreme ends of the separator 10 to cooperate with the adjoining assemblies 32 to provide a complete unit.

The assemblies 32, 32a and 32b are secured between the side walls 28 and 30 by any suitable means. The assemblies may be welded or brazed to the respective side walls or each side wall may be formed with a complementally formed channel therein to receive the ends of the respective assemblies.

As seen in FIG. 4, the air and particles will enter the separator 10 through the inlet passage 34 defined by intermediate wall 42 of one assembly and the generally planar interior extending wall 40 of the forward curved wall portion 38 of the next adjacent assembly. Separation of the particles, represented by dots, from clean air, represented by arrows, is achieved by accelerating the air and particles to a high velocity and bending or turning the airstream to reach the outlet path 36. The particles in the airstream have a high inertia and proceed in a substantially axial direction and do not make the bend with the airstream. The particles proceed rearwardly at an increasing velocity into an entrapment or collection chamber formed by the interior of reversely curved wall portion 44 and sloping wall 46 which form therebetween at their point of closest proximity, a throat section. The adverse effects of particle bounce ae minimized because the walls 40 and 42 are parallel one to the other, thereby defining an inlet path having parallel sides. The particles will thus travel the inlet flow path in a substantially straight line and will impinge on the slanting entrance wall 46. The bounce of the particles at this point will be towards the collection chamber entrance and, therefore, has no effect on the efficiency of the separator 10. Slanted wall 46 and intermediate wall 42 form therebetween a restrictive throat region wherein there will be both a velocity increase and a pressure drop experienced by the particle-laden air as it progresses toward the collection chamber entrance. In addition, particles entering the collection chamber are prevented from bouncing out of the chamber because of the slanting entrance wall configuration. Thus, it can be seen that the particles within the airstream entering the separator 10 are separated from the airstream and a substantially particle-free airstream is provided to the engine.

The particles collected within the collection chambers may be retained therein for discharge at a later time. However, in the preferred embodiment shown herein a common scavenge manifold 54 is used to collect the particles from each chamber for venting overboard. The manifold 54 is secured by any suitable means to the exterior of the side wall 30. The side wall 30 is provided with a plurality of apertures 56 therethrough. The apertures 56 are complementally formed to provide a communication between the scavenge manifold 54 and the respective collection chambers of each assembly, as defined by the reversely curved rear portion 44 of each assembly. As shown in FIG. 4, reversely curved rear portion 44 together with the support member of slant wall 46 forms therebetween a tubular-shaped particle collection chamber. High velocity particle-laden air enters these tubular-shaped chambers along one edge. Entrance of the particle-laden air, at low pressure, along one edge creates a turbulent condition within each chamber causing the particles to remain in suspension until they can be exhausted out of the chamber end via communicating aperture 56 into scavenge manifold 54. A small percentage, approximately 10%, of the air flow passing through the separator 10 will be lost to the collection chamber. This small percentage of air flow is sufficient to carry the entrapped particles from the collection chamber to the scavenge manifold 54. The particles are removed from manifold 54 by suitable means, such as a scavenge pump 58, connected therewith by conduit 57, which is driven from the gear box module 60 and discharged overboard.

It may be noted that the distance required for particles to traverse from the inlet to the outlet of the separator 10 is minimized due to the multitude of flow path channels provided. In addition, variations in the exemplary embodiment configuration may be accommodated to meet various parameters depending on the basic inlet geometry and performance specifications of the engine on which the separator is to be used. Since each channel is a complete separator in itself with only a common scavenge source or manifold, channels or assemblies may be added, deleted, lengthened or shortened without significant performance effect. It should also be noted that gravitational effects are insignificant with respect to the inertial effects of the particle and, thus, the orientation of the separator with respect to ground is not important. It can be further noted that the upstream placement of this separator may act as a noise suppressor of the front end noise, i.e., the high pitch compressor noise at the inlet.

Because of the unique structural features of the particle separator of this invention, it is seen that there is no need for existing engines to be modified nor is a large area required to accommodate the separator. The separator takes up a relatively small space and may be oriented in any direction. Further, it does an efficient job with but a small pressure drop thereacross. Accordingly, it can be seen that this invention accomplishes the objectives hereinabove set forth.

While a present exemplary embodiment of this invention has been illustrated and described, it will be recognized that this invention may be otherwise variously embodied and practiced by those skilled in the art.

What is claimed is:

1. A particle separator for separating and removing foreign particles from an airstream supplied to an engine air intake passage, said particle separator comprising:

an independent housing mounted adjacent said engine air intake passage, said housing being in communication with said engine air intake passage;

a plurality of channel assemblies mounted in parallel side-by-side relationship within said housing, adjacent assemblies defining separate tortuous passageways, each of said tortuous passageways including two turns each of less than 90°, each of said passageways being defined by said adjacent assemblies and having an air inlet and an air outlet, said air outlet being parallel to and displaced transversely from said air inlet, each of said channel assemblies comprising a curved forward wall portion at said air inlet and a reversely curved rear wall portion at said air outlet, one end of said curved forward wall portion and one end of said curved rear wall portion being joined by a generally planar intermediate wall portion positioned in substantially parallel arrangement with the inlet portion of said tortuous passageway, the other end of said curved forward wall portion extending toward the interior of said separator and defining in combination with the intermediate wall portion of an adjacent assembly the side walls of an air inlet passageway, said other end of the curved forward wall portion further extending with a bend of less than 90° as a transverse wall section which continues to and effectively joins said one end of said reversely curved rear wall portion making thereby a closed interior cavity, the other end of said reversely curved rear wall portion extending toward the interior of said separator and terminating with an inward directed structural bend, the location of said wall terminating bend being such as to form in combination with the transverse wall section of the next adjacent assembly an open slot through which air flows from said air inlet passageway to said air outlet;

a plurality of particle collection chambers generally aligned with said air inlet passageway, each of said chambers being comprised of the curved interior side of each of said reversely curved rear wall portion, and being defined by two sidewalls and a top wall, the first of said sidewalls being that portion of the intermediate wall immediately adjacent said reversely curved rear wall, the second of said sidewalls being the interior side of the other end of said curved rear wall portion, and the top of said chamber comprising a slanting wall portion forming a juncture along one end with the second of said sidewalls, the other end of said slanting wall portion terminating in a lip, the space between said lip and said first sidewall of said chamber forming a restrictive entrance throat therebetween, whereby particle laden air enters said particle collection chamber under generally turbulent conditions;

a plurality of apertures in one wall of said housing, said apertures having a shape complementary to the contour of said collection chambers, each of said apertures communicating with a collection chamber to provide particle passageways through said wall; and a scavenge manifold in communication with all of said particle collection chambers.

2. The particle separator as set forth in claim 1 further comprising means connected with said scavenge manifold for exhausting particles therefrom.

3. The particle separator as set forth in claim 1 wherein the lip at the end of said slanting wall is joined by a support member extending to and joining the interior side of said curved rear wall portion, said support member and the curved interior side of said reversely curved rear wall portion forming therebetween a tubular shaped particle collection chamber.

* * * * *